US008585072B2

(12) United States Patent  
Momaly

(10) Patent No.: US 8,585,072 B2
(45) Date of Patent: Nov. 19, 2013

(54) APPARATUS FOR TOWING A MOTORCYCLE

(76) Inventor: James Momaly, Rockford, IL (US)

( * ) Notice: Subject to any disclaimer, the term of this patent is extended or adjusted under 35 U.S.C. 154(b) by 0 days.

(21) Appl. No.: 13/410,266

(22) Filed: Mar. 1, 2012

(65) Prior Publication Data

US 2012/0223506 A1 Sep. 6, 2012

Related U.S. Application Data

(60) Provisional application No. 61/447,736, filed on Mar. 1, 2011.

(51) Int. Cl.
*B60D 1/46* (2006.01)
*B60R 9/10* (2006.01)

(52) U.S. Cl.
USPC ............... 280/402; 280/478.1; 414/462

(58) Field of Classification Search
USPC ............... 280/402, 404, 478.1, 482; 414/462, 414/463; 410/2, 3
See application file for complete search history.

(56) References Cited

U.S. PATENT DOCUMENTS

| | | | | |
|---|---|---|---|---|
| 3,430,983 A | * | 3/1969 | Jones | 280/402 |
| 5,697,629 A | * | 12/1997 | Guild | 280/402 |
| 6,352,401 B1 | | 3/2002 | LeMay | |
| 6,682,292 B2 | * | 1/2004 | Estes | 414/462 |
| 7,704,034 B1 | | 4/2010 | Quigley, III | |
| 8,016,313 B2 | * | 9/2011 | Gilels et al. | 280/402 |

* cited by examiner

*Primary Examiner* — Anne Marie M. Boehler
(74) *Attorney, Agent, or Firm* — Bruce E. Weir

(57) ABSTRACT

An apparatus for towing a motorcycle has a support platform with torque arms joined by a cross bar. The front wheel of the motorcycle is secured to the support platform and the motorcycle frame is secured to the cross bar. The support platform, torque arms, and cross bar prevent the motorcycle from lying to either side or turning about its steering neck as a towing vehicle turns. Instead, the support platform rotates about a pivot post held by upper and lower pivot sleeves. The lower pivot sleeve is secured to a tongue that attaches to a trailer hitch. The pivot post may slide up and down while supported by a jack, raising and lowering the support platform.

7 Claims, 6 Drawing Sheets

DETAIL A

APPARATUS FOR TOWING A MOTORCYCLE

CROSS-REFERENCES TO RELATED APPLICATIONS

This application claims the benefit of U.S. provisional patent application Ser. No. 61/447,736, filed by the same inventor on Mar. 1, 2011.

BACKGROUND

A motorcycle owner may need to transport a motorcycle that is disabled, or intended only for racing, show, or other special purposes, or simply because the owner wants to take the motorcycle along on a journey but requires a vehicle with more carrying capacity. A motorcycle might then be loaded onto a sufficiently large pickup or flatbed truck. However, the loading operating may be difficult, the motorcycle consumes a significant portion of the carrying capacity of the truck, and such a truck may unavailable or impractical.

A simpler method for transporting a motorcycle relies instead on a towing apparatus. U.S. Pat. No. 6,352,401 to LeMay discloses an example of such an apparatus, comprising a carrier for attachment to the rear of a tow vehicle. The LeMay apparatus includes a member extensible for receiving the front wheel of a motorcycle and retractable to lift the front wheel for towing. The extensible member includes opposing arms adapted to receive straps securing the front wheel to the apparatus.

The LeMay carrier, however, does not pivot when the tow vehicle changes direction. Rather, the motorcycle's front wheel remains fixed to the carrier while the rear of the motorcycle changes orientation by pivoting about the motorcycle's steering neck. Although this apparatus might at first glance appear to effectively convert the motorcycle into a sort of trailer, key differences between the frame geometries of trailers and motorcycles result in a serious risk of damage to a motorcycle towed with the LeMay carrier.

Unlike the tongue and ball arrangement that places a typical trailer system's pivot point at the tow hitch, the rake of a motorcycle's forks places the pivot point in Lemay's system well behind the tow hitch. Moreover, since the entire frame of a towed motorcycle may swing freely up and down about the motorcycle's front axle, and since the fork rake creates a natural tendency for a turning motorcycle to lie down sideways in the direction of the turn, a motorcycle towed with LeMay's apparatus may in a sharp turn fall away from the turn and become difficult to right. This tendency is particularly acute when the towing vehicle attempts to back up, which may cause the towed motorcycle to twist to one side and lie on the ground, becoming severely damaged and creating a road hazard.

What is needed instead is a simple apparatus that will stabilize a motorcycle for safe towing behind a larger vehicle.

SUMMARY

An apparatus for towing a motorcycle has two frame members for attaching stabilizer torque arms for preventing vertical sway of a towed motorcycle. The apparatus includes a mechanical lift base assembly that fits into a standard class 3 hitch, an adjustable pivoting support assembly, and a torque frame that secures the motorcycle to the support frame in a vertical position.

An objective of an embodiment of the invention is to provide a motorcycle-towing apparatus that pivots to turn the bike when the tow vehicle changes its direction.

Another objective of an embodiment of the invention is to provide a motorcycle-towing apparatus that maintains control of the bike with stabilizing torque arms.

Another objective of an embodiment of the invention is to provide a motorcycle-towing apparatus that has an adjustment for wheel size diameter.

Yet another objective of an embodiment of the invention is to provide an apparatus for towing a motorcycle with dual down tube frames.

All of these features and advantages of the present invention, and more, are illustrated below in the drawings and detailed description that follow.

DETAILED DESCRIPTION

Figure 1:
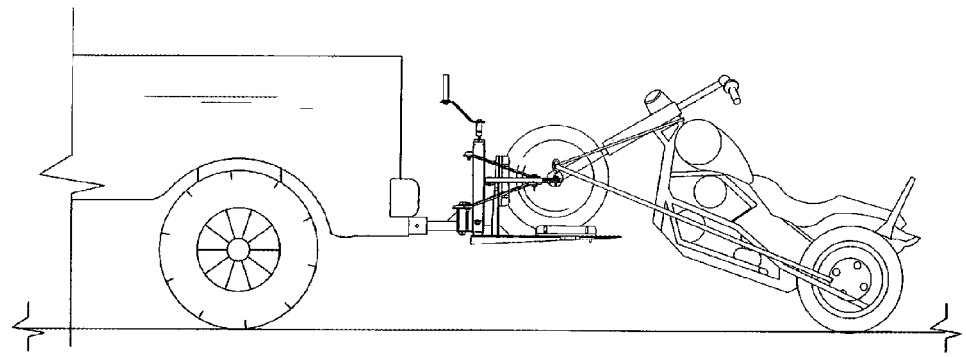
FIG. 1 shows a side elevation view of a prior art motorcycle-towing apparatus on which the front wheel of a motorcycle is mounted.
Figure 3:
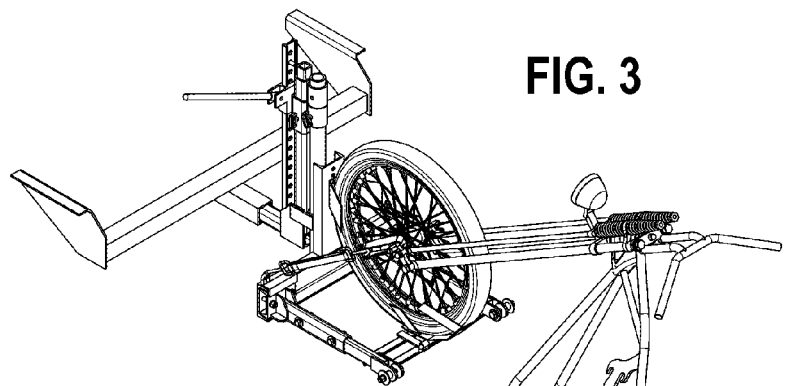
FIG. 3 shows a perspective view of a towed motorcycle leaning sideways in a turn.
Figure 2:
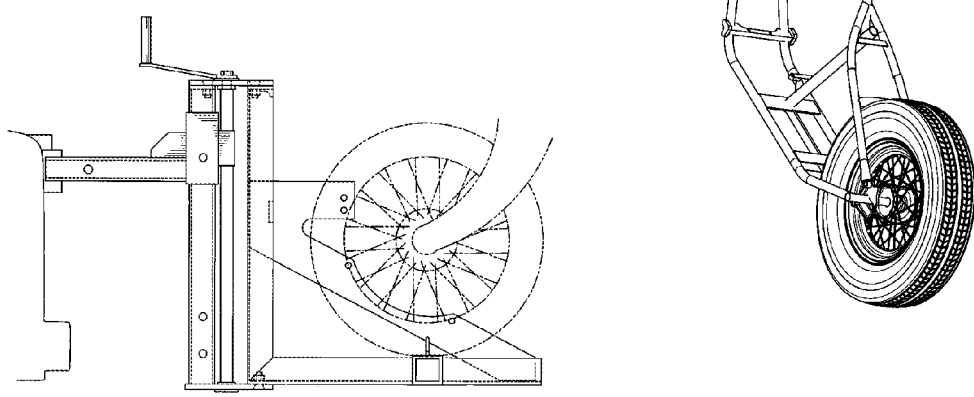
FIG. 2 shows a side elevation view of a motorcycle-towing apparatus rigidly fixed to a vehicle tow receiver.

FIG. 1 shows a side elevation view of a prior art motorcycle-towing apparatus on which the front wheel of a motorcycle is mounted. FIG. 2 shows a side elevation view of LeMay's apparatus, which is rigidly fixed to a vehicle tow receiver. FIG. 3 shows a perspective view of a motorcycle attached to a towing apparatus that rigidly holds the motorcycle's front wheel without stabilizing the frame, causing the frame to lie on one side in response to a turn by the towing vehicle.

Figure 4:
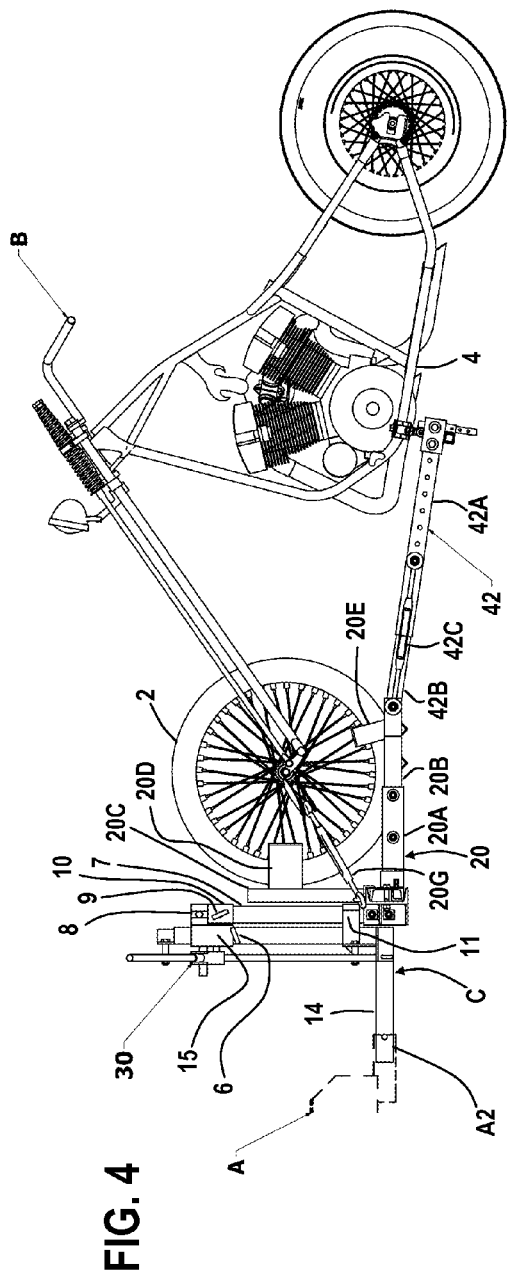
FIG. 4 shows a side elevation view of a motorcycle-towing support assembly with stabilizing torque arms.
Figure 5:
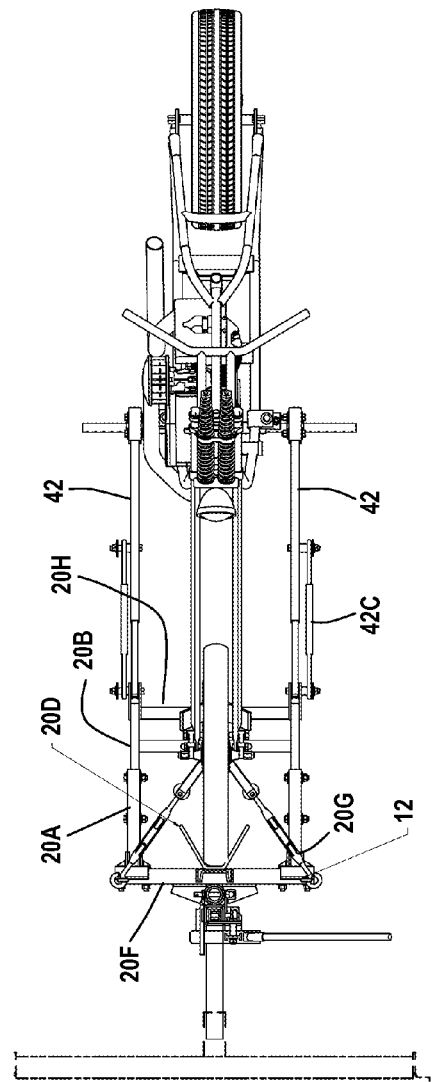
FIG. 5 shows a top plan view of the embodiment of FIG. 4.

This unstable and dangerous condition can be avoided by use of an embodiment of the invention shown in a side elevation view in FIG. 4, wherein the towing apparatus C mounted to a class 3 trailer hitch A2 on a vehicle A supports the front wheel 2 and frame 4 of a motorcycle B. FIG. 5 shows a top plan view and FIG. 6 a perspective view of the embodiment of FIG. 4. Embodiments of the invention may be constructed from steel, aluminum, and other high-strength materials as are known in the art, with components secured together by welds, fasteners, and other known methods.

In the embodiment of FIGS. 4 and 5 a support member 20 has a tee-bar 20K with forward support arm sections 20A protruding rearward from each end. Rear support arm sections 20B slide with the forward support arm sections 20A to provide length adjustment, then are locked in place with fasteners.

The support member 20 holds the front wheel 2 of the motorcycle B in a V-shaped front capture 20D and a V-shaped lower capture 20E. The front capture 20D is mounted on a vertical post 20C. The lower capture 20E is mounted on a ramp 20F (shown most clearly in FIG. 6) that captures the bottom rear portion of the front tire when front axle is past the lower capture 20E. The front tire 2 is thereby secured at four points. The ramp 20F is attached to and supported by a pair of ramp support bars 20H that span the rear support arm sections 20B. Turnbuckles or straps 20G tie the front axle of the motorcycle B to horizontal tie eyelets 12.

The tee-bar 20K of the support member 20 is secured to a vertical pivot post 7 that rotates about a vertical axis within an upper pivot sleeve 10 and lower pivot sleeve 11. A support collar 8 secured to the upper end of the pivot post 7 transmits the load of the support member 20 downward onto the upper pivot sleeve 10 while allowing the pivot post 7 to rotate freely within the pivot sleeves 10, 11. A locking pin 9 passing through the upper pivot sleeve 10 may prevent the pivot post 7 and support member 20 from rotating until the motorcycle B is ready for transport.

The upper pivot sleeve 10 is secured to an angle sleeve 15 which slides vertically along an angle post 13. The lower end of the angle post 13 is secured to the lower pivot sleeve 11 and an angle tongue 14. Horizontal loads created by the support member 20 are thus reacted primarily by the lower pivot sleeve 11 and transmitted through the angle tongue 14 to the trailer hitch A2.

Figure 8:
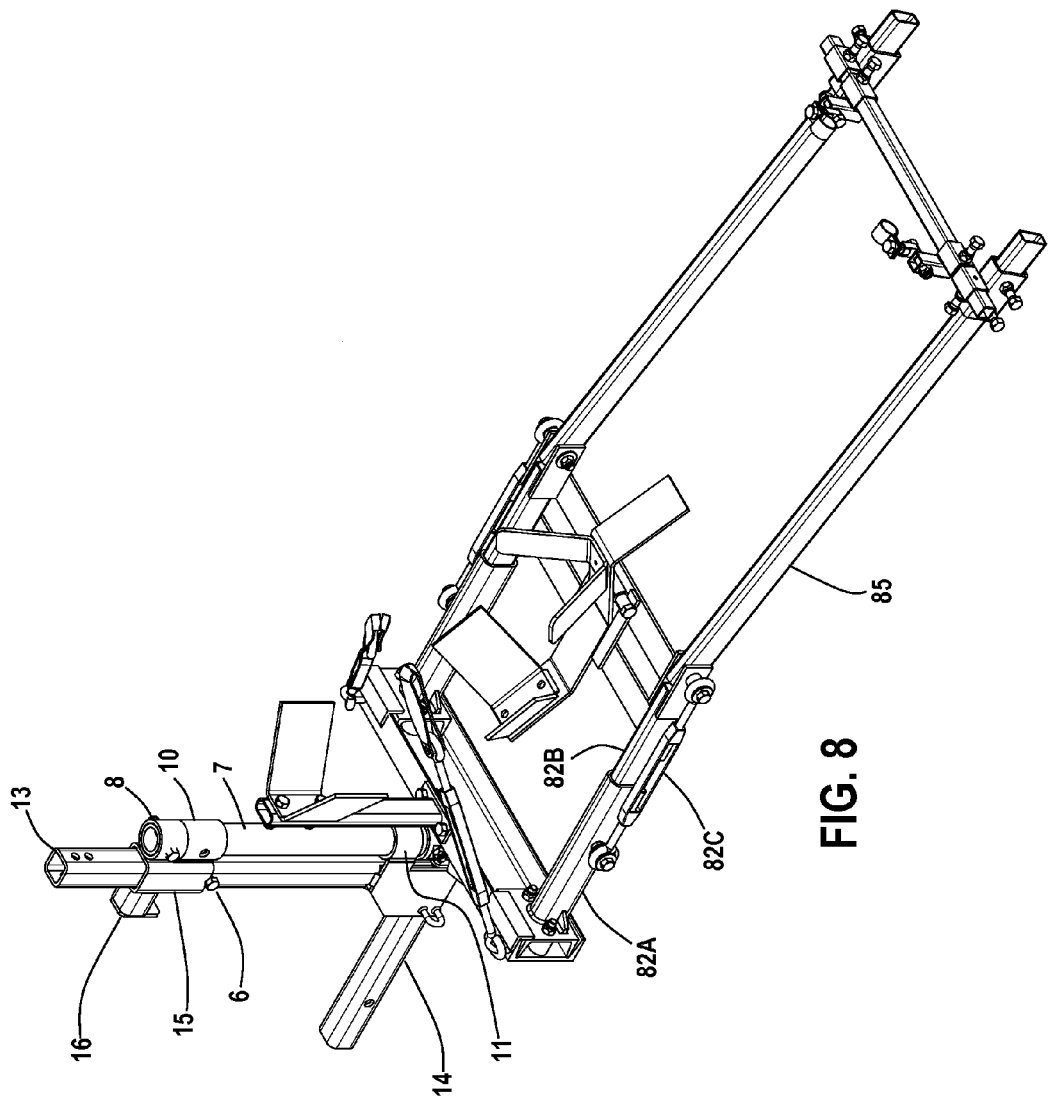
FIG. 8 shows a perspective view of an alternate embodiment.
Figure 9:
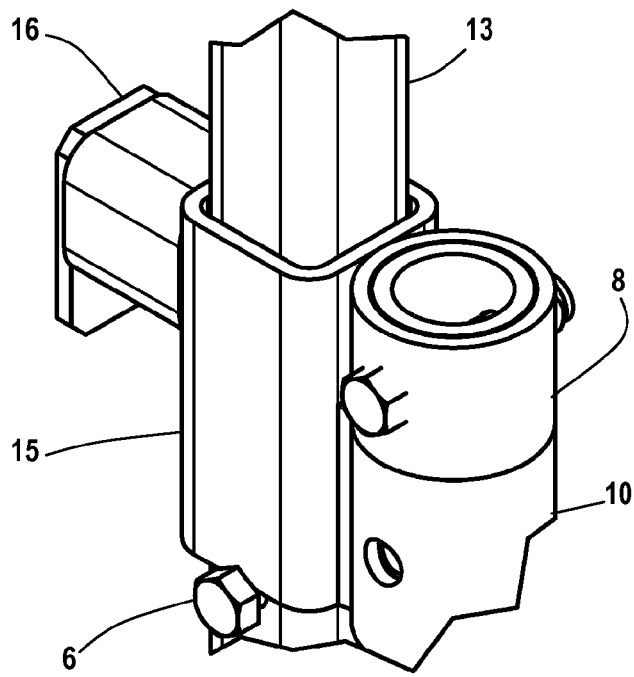
FIG. 9 shows a perspective view of an angle sleeve and support collar.
Figure 11:
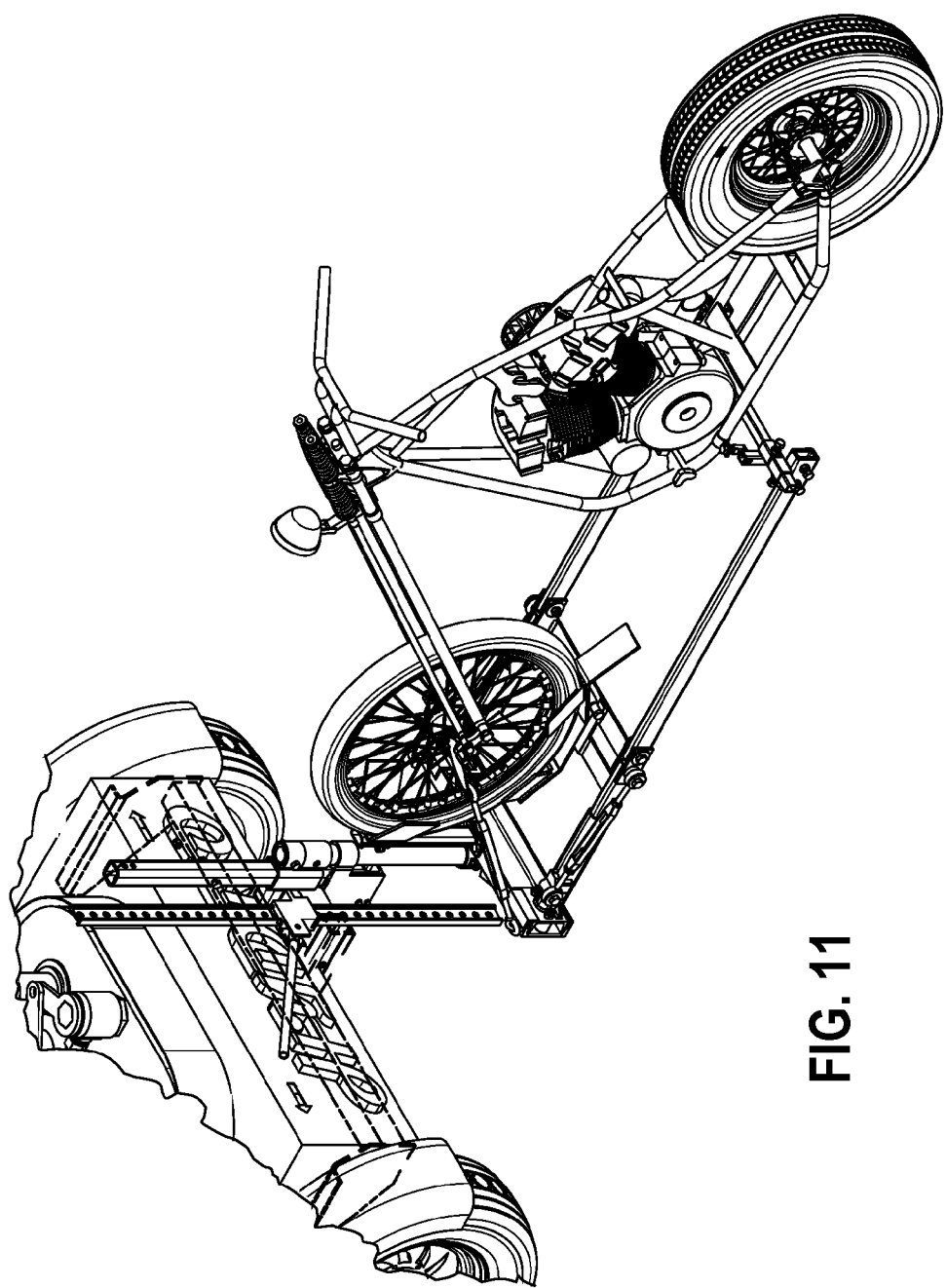
FIG. 11 shows a perspective view of an alternate embodiment of the invention lowered to ground level.

In the embodiment shown in FIGS. 4 and 5 a jack assembly 30 may be secured to the angle sleeve 15 and the lower end of the angle post 13. Alternatively, a jack support 16 may be secured to the angle sleeve 15 as shown in the embodiment of FIGS. 8, 9 and 11. In either embodiment, when the support member 20 is raised a support pin 6 may hold the support member 20 in position to remove weight from the jack assembly 30 or jack support 16. The jack assembly 30 or a separate jack applied to the jack support 6 may raise and lower the support member 20 between a ground level position (shown in FIG. 11) and a transport position (shown in FIG. 4), with the angle sleeve 15 sliding up and down the angle post 13 while the pivot post 7 slides up and down within the lower pivot sleeve 11.

Returning to FIGS. 4 and 5, the motorcycle frame 4 is held in a vertical position by telescoping torque arms 42 pivotably attached to the support member 20. Forward torque arm sections 42B may slide within rear torque arm sections 42A to make the torque arms 42 longer or shorter. Torque arm 42 length and the vertical attitude of the motorcycle B may be adjusted with turnbuckles 42C connecting the forward torque arm sections 42B to the rear torque arm sections 42A. Similar length adjustments may be effected in the embodiment of FIG. 8 by a turnbuckle 82C that causes rear torque arm section 82B to slide within forward torque arm section 82A.

Figure 6:
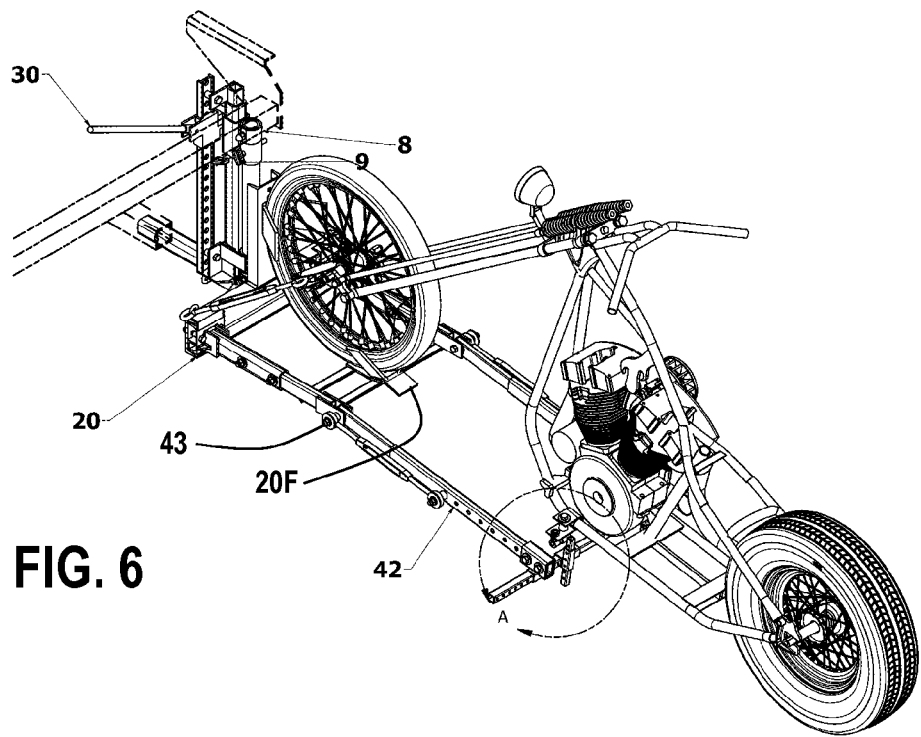
FIG. 6 shows a perspective view of the embodiment of FIG. 4.
Figure 7:
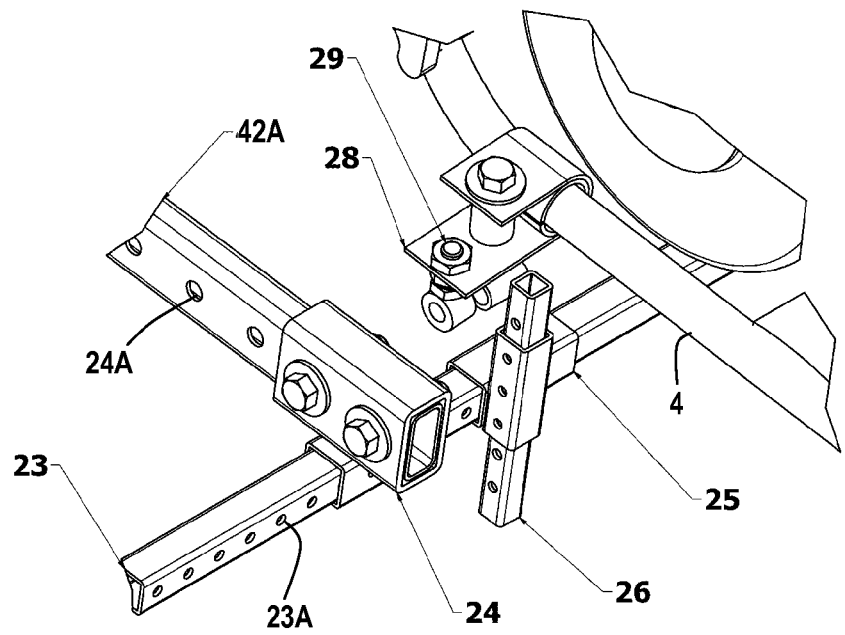
FIG. 7 shows a perspective view of Detail A of FIG. 6.

FIG. 7 shows a perspective view of Detail A of FIG. 6. A cross arm position adjustor 24 attaches a cross arm 23 to a rear torque arm section 42A. The cross arm position adjustor 24 slides fore and aft along the rear torque arm section 42A to accommodate motorcycles of various lengths. Both the cross arm 23 and the rear torque arm section 42A have adjustment holes 23A, 24A at approximately 2.5 cm intervals. A width adjustor 25 slides on the cross arm 23 to horizontally position a height adjustor 26, which in turn supports a pivot bolt 29 and an adjustable clamp 28.

The cross arm position adjustors 24, the width adjustors 25, the height adjustors 26, and the pivot bolts 29 position the adjustable clamps 28 to capture the crash bars or frame 4 of the motorcycle B, thereby attaching the torque arms 42 to the motorcycle frame 4 to hold the motorcycle B upright while being towed.

Figure 10:
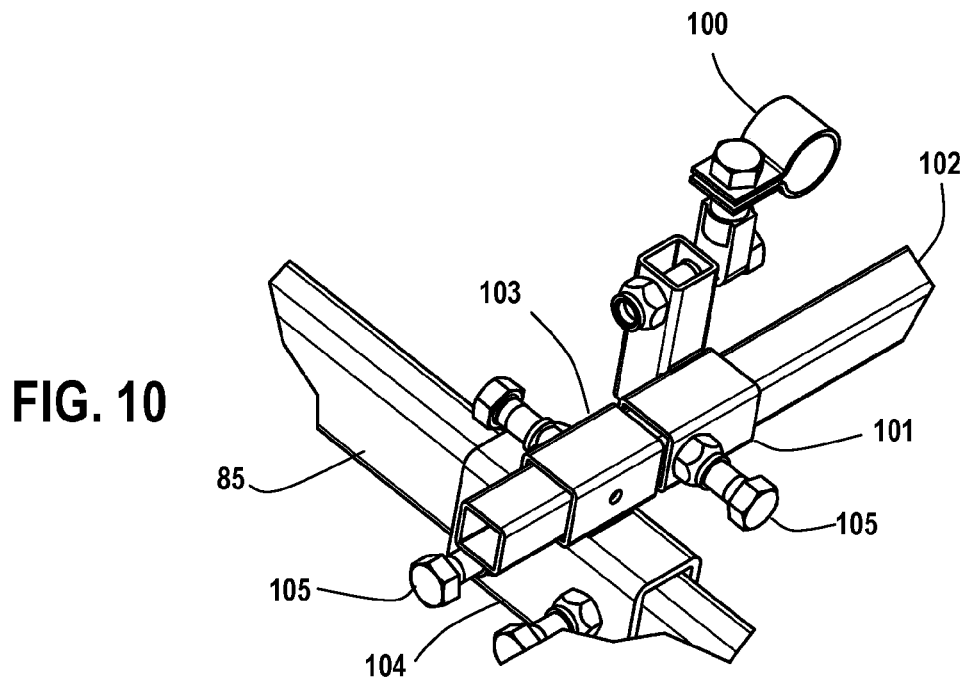
FIG. 10 shows a perspective view of an alternate clamp adjustment assembly.

FIG. 10 shows an alternate embodiment of a clamp assembly with an adjustable clamp 100 mounted on a width adjustor 101 that slides horizontally on a cross bar 102. A cross arm position adjustor 104 slides fore and aft on a rear torque arm section 85. Each adjustor may be moved to fit a motorcycle crash bar or frame, then secure with a fastener 105.

Returning to FIGS. 4 and 5, the torque arms 42 may pivot upward and downward about pivot bolts 43 that attach the torque arms 42 to the support member 20, but rigid attachment of the cross arm 23 to each torque arm 42 and of the motorcycle crash bars or frame 4 to the cross arm 23 creates a torque that resists rotation of the motorcycle B about the motorcycle's long axis as the towing vehicle and motorcycle turn together. The support member 20 and torque arms 42 also maintain substantial alignment between the motorcycle's front wheel and the portion of the motorcycle aft of the steering neck, preventing the motorcycle from rotating about its steering neck.

Unlike prior art inventions which allow a motorcycle to turn about its steering neck, embodiments of the present invention hold a motorcycle substantially upright while accomplishing a turn via rotation of the pivot post 7 within the pivot sleeves 10, 11. The towed motorcycle B is thereby allowed to freely follow a tow vehicle in a turn while being prevented from following its natural tendency to lie on one side when the tow vehicle turns or backs up.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. An apparatus for towing a motorcycle, comprising:
   a support member, the support member having a tee-bar, at least a first ramp support bar, and at least a first support arm and a second support arm, the tee-bar having a first end and a second end, each support arm having a proximal end and a distal end, the proximal end of the first support arm attached to the tee-bar proximate to the tee-bar first end, the proximal end of the second support arm attached to the tee-bar proximate to the tee-bar second end, the support arms projecting in substantially the same plane and direction from the tee-bar, the ramp support bar spanning the support arms;
   at least a first torque arm and a second torque arm, the first torque arm pivotably attached to the distal end of the first support arm, the second torque arm pivotably attached to the distal end of the second support arm;
   a cross bar, the cross bar attached to and spanning the first torque arm and the second torque arm;
   at least a first clamp, the first clamp slidably attached to the cross bar and operable to grasp a portion of a motorcycle;
   a pivot post, the pivot post attached to the tee-bar and oriented orthogonally to the support arms;
   an angle post and an angle tongue, the angle post attached orthogonally to the angle tongue and oriented parallel to the pivot post;
   an angle sleeve and an upper pivot sleeve, the interior of the angle sleeve sized and shaped to closely conform to the external cross-section of the angle post, the angle sleeve surrounding and sliding on the angle post, the upper pivot sleeve attached and oriented parallel to the angle sleeve, the interior of the upper pivot sleeve sized and shaped to closely conform to the external cross-section of the pivot post, the upper pivot sleeve surrounding the pivot post, the pivot post rotating within the upper pivot sleeve; and a lower pivot sleeve, the lower pivot sleeve attached to the angle post, the interior of the upper pivot sleeve sized and shaped to closely conform to the external cross-section of the pivot post, the upper pivot sleeve surrounding the pivot post, the pivot post rotating within the upper pivot sleeve; the interior of the lower pivot sleeve sized and shaped to closely conform to the external cross-section of the pivot post, the lower pivot sleeve surrounding the pivot post, the pivot post rotating within the lower pivot sleeve.

2. An apparatus for towing a motorcycle as claimed in claim 1, additionally comprising:

a support collar, the support collar attached to an upper end of the pivot post and rotating against an upper edge of the upper pivot sleeve.

3. An apparatus for towing a motorcycle as claimed in claim 1, additionally comprising:

a jack support attached to the angle sleeve.

4. An apparatus for towing a motorcycle as claimed in claim 1, additionally comprising:

a jack attached to the angle sleeve.

5. An apparatus for towing a motorcycle as claimed in claim 1, additionally comprising:

a vertical post mounted on the tee-bar, a front capture mounted on the vertical post, and a lower capture mounted on the ramp support bar.

6. An apparatus for towing a motorcycle as claimed in claim 1, wherein each support arm comprises at least two telescoping sections.

7. An apparatus for towing a motorcycle as claimed in claim 1, wherein each torque arm comprises at least two telescoping sections.

* * * * *